United States Patent [19]

Kolze

[11] 4,267,711

[45] May 19, 1981

[54] CONTROL SYSTEM FOR LAUNDRY APPLIANCE

[75] Inventor: Lawrence A. Kolze, Bensenville, Ill.

[73] Assignee: Eaton Corporation, Cleveland, Ohio

[21] Appl. No.: 84,958

[22] Filed: Oct. 15, 1979

[51] Int. Cl.³ .............................................. D06F 33/02
[52] U.S. Cl. .................................. 68/12 R; 68/207; 137/387
[58] Field of Search ................ 68/207, 12 R; 137/387

[56] References Cited

U.S. PATENT DOCUMENTS 3,030,790  4/1962  Davenport et al. ............. 137/387 X Primary Examiner—Philip R. Coe
Attorney, Agent, or Firm—R. J. McCloskey; R. A. Johnston

[57] ABSTRACT

A system (10) for controlling the flow of temperature selected water to the tub of a washing machine. Individual solenoid operated inlet valves (12,15) are employed to admit and control mixing of water from a heated and unheated source. The temperature selected mixed water is discharged through a third solenoid operated diverter valve (24) yielding a high rate of flow when the solenoid thereof is deenergized and a lower rate of discharge to the tub when the flow control valve solenoid is energized by the water level sensing switch (48) associated with the tub. A timer controlled switch (82) interrupts the power to the hot and cold filling valves to provide stepped filling during agitation during washing and rinsing cycles. The valve assembly employs only three solenoid valve operators.

7 Claims, 3 Drawing Figures

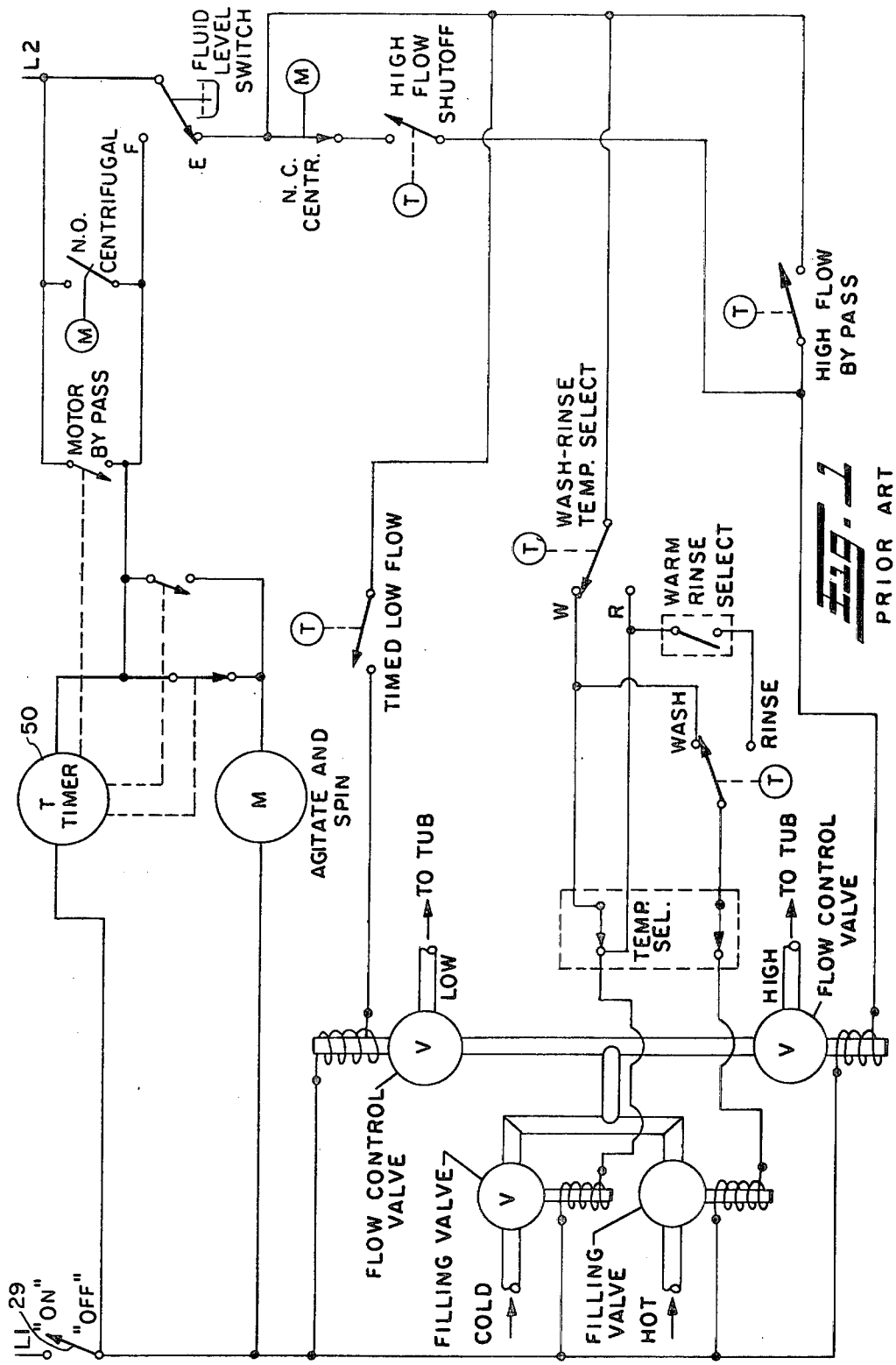

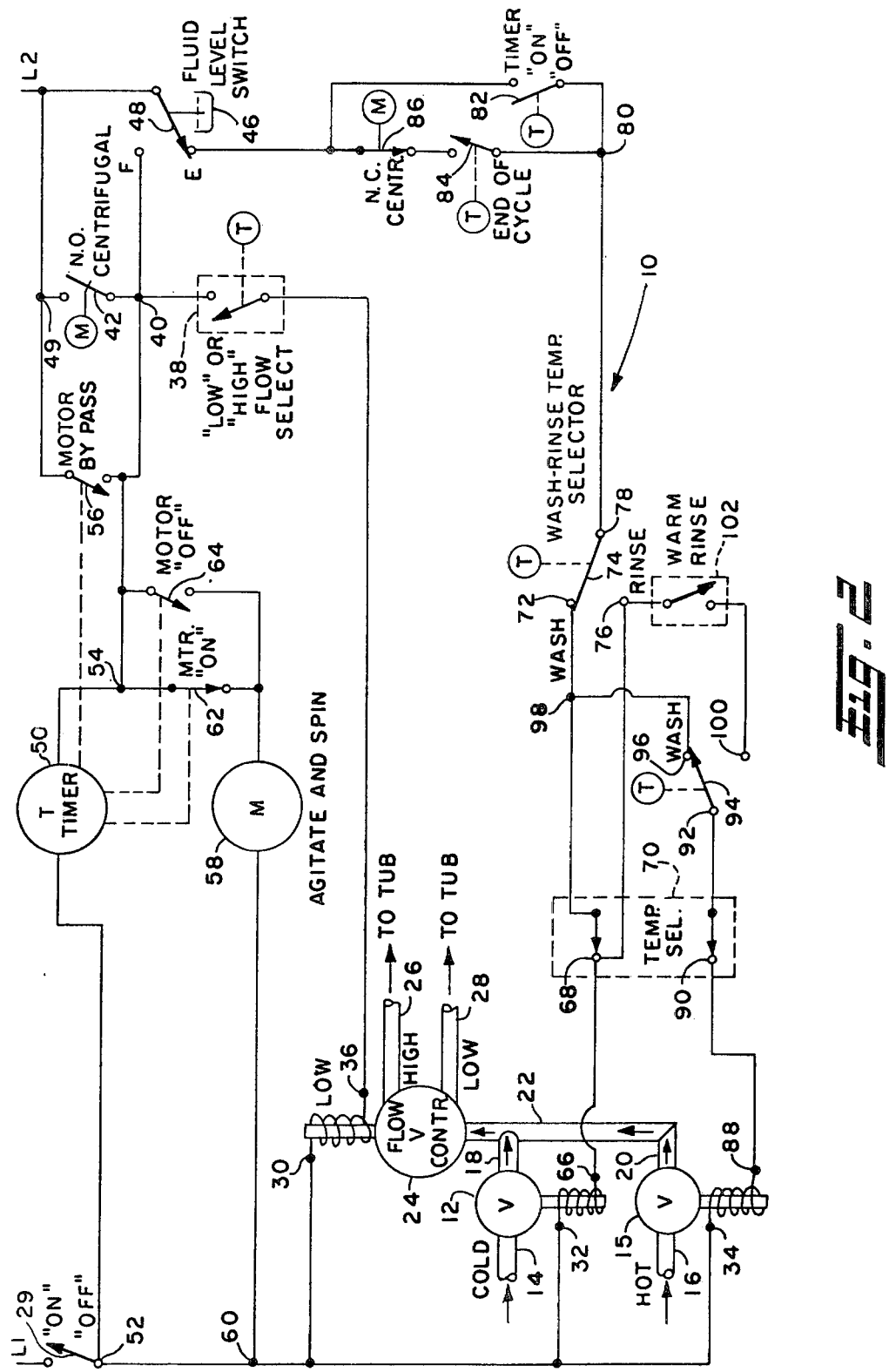

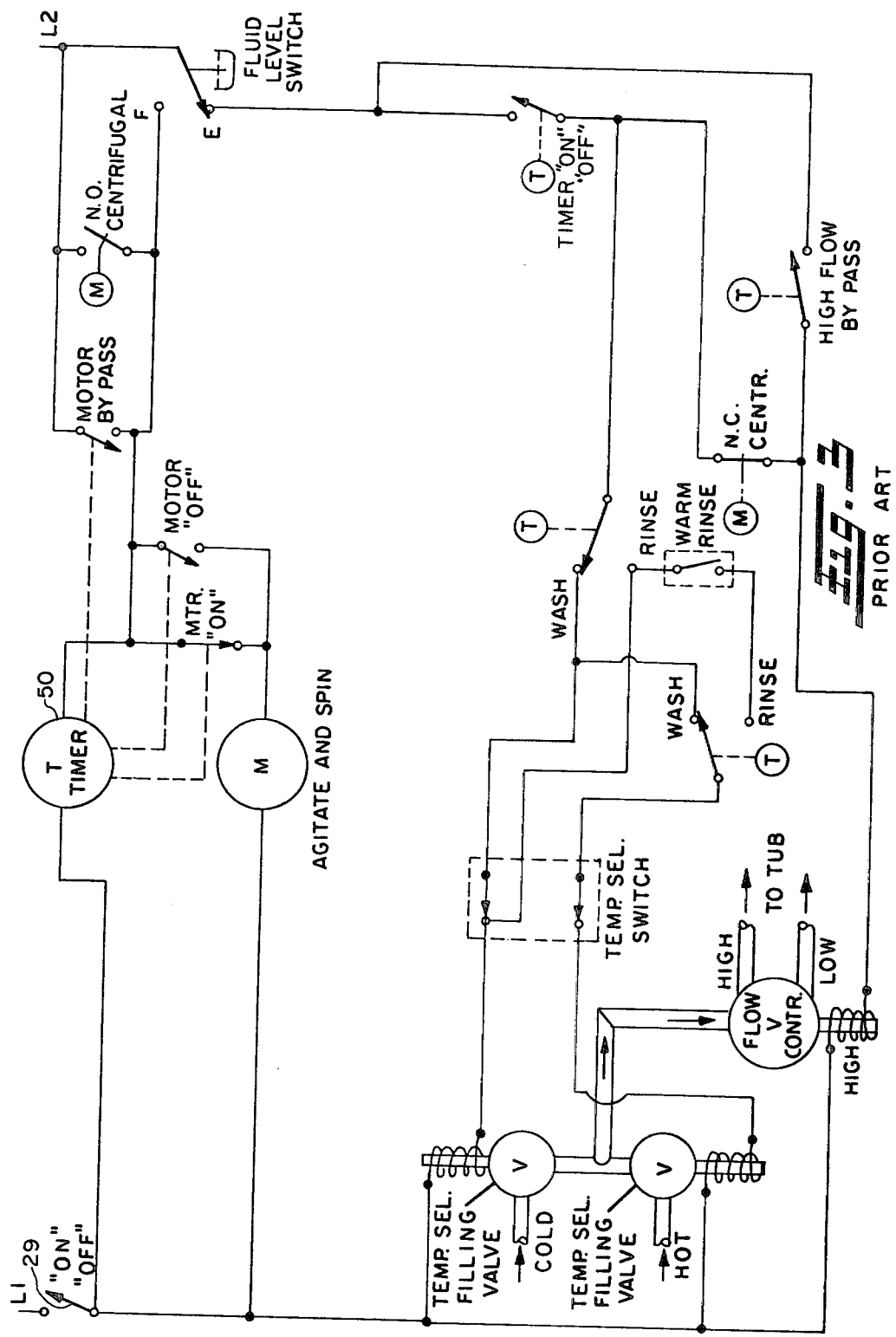

CONTROL SYSTEM FOR LAUNDRY APPLIANCE

BACKGROUND OF THE INVENTION

The present invention relates to home laundry appliances and particularly, washing machines of the type having a receptacle filled with fluid into which the articles to be washed are immersed and agitated in the fluid by a motor driven mechanism. Washing machines of this type usually have solenoid operated filling valves for controlling the flow of water into the receptacle. Typically, a fluid level sensing switch actuates the solenoid fill valves to admit water when the machine is initially turned on or at the end of various washing and rinsing cycles when the water has been drained from the receptacle. The fluid level switch deactivates the filling valve when the level in the receptacle reaches the desired level for washing. It is known to utilize separate solenoid operated fill valves for the hot and cold water inlets to the machine to enable selective hot or cold filling or a mixing of the hot and cold water supply to produce washing liquid of an intermediate temperature.

It is known to activate the solenoid operated filling valves by a motor driven timer which in turn is energized by a centrifugal switch attached to the main agitation and spin motor. This arrangement prevents water from entering the washing receptacle or tub until the cycle control timer is operative. It is also known to utilize a two-stage flow control arrangement for initially filling the tub at a high rate of flow and upon the water in the tub reaching the desired level, changing to a lower flow rate for replenishing the water discharged from the tub during the various washing and rinsing cycles. In the typical washing machine the timer motor drives a set of cams which actuate electrical contacts for making and breaking circuits to energize the fill valve solenoids in the proper time sequence and for the desired time intervals.

In order to improve the laundering efficiency of washing machines, it has been found desirable to interrupt the flow of water to the tub during periods of agitation to permit the articles to be agitated in water and detergent wherein the articles are agitated in varying levels of water, detergent and suds mixture in differing proportions for specified intervals of time. Thus, it has been found desirable to not only selectively vary the temperature of the water entering the tub for various fabric cycles and to provide initial rapid fill with a subsequent lower rate fill during the washing cycle, but also to provide means for intermittently interrupting the flow of water to the tub during agitation. This combination of requirements has necessitated the use of a plurality of filling and flow control solenoid valves to provide the desired control functions for the tub filling.

One known technique for providing the aforesaid control of the tub water fill during the washing cycles is shown in FIG. 1 as employing the usual separate hot and cold solenoid operated filling valves, the output of which are mixed and applied to the inlet of respectively separate solenoid operated high and low flow rate control valves. This arrangement permits the separate timed energization of the hot and cold filling valves for providing the appropriate water temperature and separate timed activation of the high or low flow control valve to admit the water of the desired temperature at the desired flow rate. In the prior art arrangement of FIG. 1 the separate high and low flow solenoid operated flow control valves are energized by switches activated by separate control cams on the motor driven washing machine timer. The disadvantage of the prior art system shown in FIG. 1 is that it requires four individual solenoid operated valves to accomplish the desired water fill control functions. The water fill control system of such a prior art system is costly to manufacture and wasteful energy, because at least either the hot or cold fill valve coil and either the high or low flow control valve solenoids must be actuated during washing operation and thus a continuous power drain for two solenoid valves is encountered.

Another known scheme for providing control of the water filling functions of a washing machine of the above described type is shown in FIG. 3 wherein only three solenoid operated water valves are employed. The prior art system of FIG. 3 employs the usual individual hot and cold temperature selection filling valves respectively having their inlets connected to the hot and cold water line with the outlets thereof mixed applied to the inlet of a flow control valve. The flow control valve of the prior art system of FIG. 3 is a solenoid operated valve which provides a high rate of flow upon activation of the solenoid; and, when the solenoid is deenergized the valve provides a continuous flow at a substantially lower rate. The prior art system of FIG. 3 has no provision for the electrical power interruption and restart of the water flow to the machine during the normal washing, rinsing and agitation cycles. The prior art system of FIG. 3 after the initial fast fill of the tub and during normal washing and rinsing operations requires that at least one of the temperature selection filling valves be continuously activated, and thus requires continuous energization of one less valve than the prior art scheme of FIG. 1. However, the prior art system of FIG. 3 does not permit machine cycle restart after electrical power interruption of water flow to the machine tub. The prior art system of FIG. 3 relies on the fluid level switch to terminate all water flow when the tub is full. It will be recognized by those skilled in the art that in the known system of FIG. 3, if line power is interrupted with all the timer controlled switches in the open position except "MTR ON" and with the fluid level in the "F" position, upon resumption of line power, the main motor will not restart unless the timer is manually repositioned to close the "motor by-pass" switch. Further, it will be apparent that in the known system of FIG. 3, if line power is interrupted with fluid level switch in the "E" position (tub drained) and timer switches are open, the timer must be manually restarted to close the "timer on-off" switch in order to reenergize the filling valves to fill the tub.

It has thus been desired to provide a water fill control system for a domestic washing machine wherein the filling of the tub with water at the preselected temperature may be staged or performed at timed intervals with selected dwell periods therebetween while the machine is agitating during the wash and rinse cycles. It has thus been desired to find a way of utilizing the cycle timer of the machine to control the water filling rate and schedule rather than leaving the control of the water fill to the liquid level sensor in the machine tub.

SUMMARY OF THE INVENTION

The present invention provides a system for controlling the manner of liquid filling of the receptacle or tub of a home laundry washing machine and which provides a solution to the above-described problem. In the control system of the present invention a separate solenoid operated mixing valve is employed at the hot and cold water inlet lines, with the output of the respective valves being mixed and applied to the inlet of a single solenoid operated flow control valve. The energization and deenergization of the hot and cold filling valves and the flow control valve is controlled by switches slaved to the washing machine cycle timer for energization and deactuation in the desired sequence and for the desired time intervals. The flow control valve of the present invention provides a high flow rate for filling in the deactuated condition and upon energization, provides a substantially lower flow rate for replenishment and duty cycle filling. The valve is slaved to the machine timer which may be programmed to interrupt the hot and cold filling valves and flow control valve solenoid coil energization to provide periods of dwell during the wash and rinse agitation. The present invention thus eliminates the need for a fourth solenoid operated flow control valve and yet provides for duty cycle interruption of the water flow to the tub during the normal washing and rinsing operations. The water fill control system of the present invention, by requiring the flow control valves to be energized only when a low flow rate is required, thus enables a solenoid operated valve of lower power consumption to be employed. The hot and cold temperature mixing inlet valves of the control system of the present invention, during normal washing operations, are operated in an intermittent duty cycle and thus need not be rated for continuous service. The control system of the present invention provides for full flow to the tub upon restart in the event of temporary line power interruption when the timer controlled switches are open circuit without the need for manual repositioning of the timer. The washing machine water fill control system of the present invention thus provides a control system having the minimum number of solenoid operated valves and provides maximum flexibility of control during the water flow filling of the tub, yet operates the valves with a minimum of power consumption during the operating cycles of the washing machine.

BRIEF DESCRIPTION OF THE DRAWINGS

FIG. 1 is a schematic of the water flow inlet and electrical control circuit of one known prior art laundry appliance control system;

FIG. 2 is a view similar to FIG. 1 illustrating the washing machine liquid fill control system of the present invention; and FIG. 3 is a view similar to FIG. 1 showing another known prior art washing machine water fill control system.

DETAIL DESCRIPTION

Referring now to FIG. 2, the control system of the present invention is denoted generally at 10 as having a solenoid actuated inlet valve 12 with the inlet thereof adapted for connection to a supply of cold water as, for example, the pressurized tap of the household cold water line 14. A second solenoid actuated valve 15 is provided and has the inlet thereof adapted for connection to a source of heated water as, for example, the tap of the household hot water line 16. The outlet 18 of the cold water valve and the outlet 20 of the hot water valve are connected to a common conduit 22 for providing a mixed flow of water at a desired temperature. The conduit 22 is connected to the inlet of a flow control diverter valve 24 which is also of the solenoid actuated variety. The flow control valve 24 has a first, or high rate, flow outlet 26 and a second, substantially lower rate, outlet 28 with both outlets being connected to conduits leading to the washing machine receptacle or tub (not shown). The valve 24 includes means biasing the solenoid to the deenergized position for high rate flow.

The machine is typically equipped with a manual "on"-"off" switch 29 adapted for series connection to one lead $L_1$ of a power supply and the line $L_1$ is connected to one end of the solenoid coil of valves 24, 12, and 15 respectively through terminals 30, 32 and 34, the other end 36 of the solenoid coil of valve 24 is connected through a flow select switch 38 to the common terminal 40 of a normally open centrifugal switch 42 with the opposite pole of switch 42 being connected through junction 49 to the opposite lead $L_2$ of the power supply.

A fluid level sensor 46 is provided and is responsive to the liquid level in the tub to actuate the single pole double throw switch 48 from one pole denoted "E" and another terminal labeled "F" which is also connected to the common terminal 40 of centrifugal switch 42. Thus, when the fluid level sensor 46 actuates switch 48 to the "F" position, centrifugal switch 42 is bypassed and switch 38 is energized directly.

A motor operated timer 50 is provided having one pole of the motor coil connected to line $L_1$ through the common terminal of switch 29 at terminal 52 and the other pole of the motor coil connected to junction 54. Junction 54 is also connected to the common terminal 40 of the normally open centrifugal switch and through a bypass switch 56 to the power lead $L_2$. Thus, the timer may be energized by either centrifugal switch 42 or by the fluid level switch 48 as indicated by the dashed line connection in FIG. 2.

The control system of FIG. 2 employs a main agitate and spin motor 58 having one power lead thereof connected to power lead $L_1$ through junction 60 and the other power lead connected to junction 54 through a normally closed motor "on" switch 62 and also connected through a normally open motor "off" switch 64 to the common terminal 40 of the centrifugal switch and one side of motor bypass switch 56. The motor 58 is thus energized by the fluid level switch 48. The normally open centrifugal switch 42 is connected to the shaft of motor 58 and at a predetermined speed the switch closes to energize the timing motor 50 which controls the operation of switches 56, 64, 62, 38 and 84 in accordance with a predetermined program sequence. It will be readily understood by those skilled in the art that switch 84 functions in the well known and commonly employed arrangement whereby the switch is reset by the operator upon actuation of the controls to begin a new cycle.

The remaining terminal 66 of the solenoid coil for cold water valve 12 is connected to one terminal 68 of temperature select switch 70 through the switch 70 to the "wash" terminal 72 of single-pole double throw switch 74 which serves as a wash-rinse temperature selector switch and which is slaved to timer 50. The opposite terminal 76 of switch 74 is the "rinse" position switch which is connected directly to terminal 68 within temperature selector switch 70 to thus bypass switch 70. Common terminal 78 of switch 74 is connected to junction 80, which is connected through timer controlled switch 82 to the "E" contact of fluid level switch 48, junction 80 is also connected to the "E" contact of fluid level switch 48 through a timer control "end-of-cycle" switch 84 and through a normally closed centrifugal switch 86 which is actuated by the main motor 58.

The remaining terminal 88 of the solenoid coil for hot water valve 14 is connected to a second terminal 90 of the temperature select switch 70 and through the switch 70 to common terminal 92 of a timer controlled single-pole double-throw switch 94 having the "wash" output terminal 96 connected to the "wash" terminal 72 of selector switch 74 via junction 98. The remaining "rinse" terminal 100 of switch 94 is connected through a "warm-rinse" switch 102 to the "rinse" terminal 76 of selector switch 74.

In operation, upon closing switch 29, and switch 84 machine tub filling is completed from $L_1$ through the hot and cold valve solenoids, through the normally closed centrifugal, through switch 84, switch 86, the fluid level switch 48 to $L_2$. Upon the fluid sensor 46 sensing the desired level of water in the machine tub, the switch 48 moves to complete the circuit through the F terminal, deenergizing the hot and/or cold solenoid to stop tub filling and to start motor 58. Motor 58, upon energization, opens the normally closed centrifugal switch 86 and closes the normally open switch 42. Energization of motor 58 now allows a circuit to be completed through switch 42 and 38 to cause actuation of the low flow solenoid. Subsequent to the initial tub filling, the wash tub drains and switch 48 returns to position E. It will be apparent from FIG. 3 that, so long as motor 58 is running, centrifugal switch 42 remains closed and maintains a completed circuit through junction 49 and junction 54 to keep the timer 50 running upon subsequent draining of the tub and movement of fluid level switch to the 'E' position. The circuit to the hot and cold water valves is now completed through switch 48 terminal E and 82. Thereafter "on-off" of all flow is controlled through switch 82. High or low flow is then selected through timer actuated switch 38. When the timer closes switch 82, the temperature select switch 70 will energize either one or both of the hot and cold valves 12, 14 depending upon the position of the wash-rinse temperature selector switch 74. So long as the timer operates to hold switch 38 closed, the flow control valve 24 will be energized to the low flow mode and will discharge through line 28 to the machine tub. As the timer intermittently opens and closes swiich 82, the cold and hot valves 12, 14 will be cycled on and off to vary the fill schedule as commanded by the timer.

The present invention has been described hereinabove as providing a low cost water filling control system for a washing machine having separate solenoid actuated hot and cold water inlet mixing valves which discharge to a common inlet of a single solenoid actuated flow control valve. In the deactuated condition the flow control valve provides for initial high rate flow and upon the water level sensor closing a switch the flow control valve solenoid is energized to change the flow control valve to a substantially lower rate of flow discharge. This unique arrangement of the single solenoid flow control valve permits the use of a low-power valve held open only against the lower flow rate forces of the water in the low flow rate mode. In addition, the control system of the present invention permits the low rate flow to be interrupted intermittently by the machine timer by intermittently disrupting power to the hot and cold inlet fill valves which thus need not be rated for continuous duty. The present invention, therefore, provides maximum flexibility for programming the water filling function of a washing machine to conserve electrical power and to maximize the effect of agitation of the articles to be washed. The control system of the present invention thus permits intermittent filling during agitation and yet provides control of the filling operation with the minimum number of solenoid actuated valves.

Although the invention has been described hereinabove with reference to the embodiments in the attached drawings, it will be understood by those having ordinary skill in the art that the invention is capable of modification and variations and is limited only by the following claims:

I claim:

1. A control system for a laundry appliance of the type having a receptacle filled with washing fluid and the articles to be laundered are agitated in the fluid by a motor, said control system comprising:

(a) headsensor means operable in response to the fluid level in said receptacle to make and break an electrical circuit when said fluid level is greater than or less than a predetermined value;

(b) circuit means operable in response to said headsensor means to energize the machine motor from a source of power;

(c) timing means adapted for connection to a source of power and operable in response to energization of said motor means to provide a plurality of outputs at predetermined time intervals;

(d) fill valve means having a first input adapted for connection to a source of heated washing fluid and a second input adapted for connection to a source of unheated washing fluid and operable in response to making of said headsensor circuit to provide a selected mixture of said heated and unheated washing fluid;

(e) flow control valve means having the input thereof connected to receive the flow of washing fluid mixture from said fill valve means, said flow control valve means being operable in a first state to provide a first, or low, rate of flow therethrough and being operable in a second state to provide a second, substantially higher, rate of flow therethrough for filling said washing receptacle, said flow control valve means including actuator means operable upon connection to a source of power to change said flow control valve means from said high-flow state to said low-flow state and means biasing said valve means to said high-flow state;

(f) low-switch means operable in response to one of said timing means out puts to connect said flow control valve actuator means to a source of power for changing said flow control valve means to said low-flow state; and, (g) duty cycle switch means operable in response to a second output of said timing means to intermittently interrupt said connection of said fill valve means to said source of power thereby intermittently stopping flow of said washing fluid.

2. The control system defined in claim 1, further comprising normally open centrifugal switch means, series connected to said low-flow switch means and operable to close upon energization of the laundry appliance motor for connecting said low-flow switch to a source of power.

3. The control system defined in claim 1, wherein said fill valve actuator means comprises electromagnetic means operable upon energization to move a seated valve member.

4. The control system defined in claim 1, wherein:
   (a) said fill valve means includes a first electromagnetically actuated valve connected to said unheated fluid inlet and a second electromagnetically actuated valve connected to said heated fluid inlet; and,
   (b) said flow control valve means includes a third electromagnetically actuated valve.

5. A control system for a laundry appliance of the type employing a motor energizable for agitating the articles to be washed in a fluid contained in a receptacle upon connection of the appliance to a source of heated and unheated washing fluid, said control system comprising:
   (a) energizable valve means operable upon energization to provide a preselected mixture of said heated and unheated fluid to said receptacle, said valve means including means in the deenergized condition operable to provide a first or high rate of flow of said mixture and upon control energization operable to provide a second substantially lower rate of flow;
   (b) timing means operatively responsive to energization of the appliance motor to provide said control energization and a duty cycle output;
   (c) control switch means operable in response to said duty cycle output to disable said valve means for preventing flow of said fluid to said receptacle.

6. A control system for a laundry appliance of the type employing a receptacle containing washing fluid at a preselected temperature and a motor for agitating the articles to be washed in the fluid, said control system comprising:
   (a) fill valve means having a first inlet adapted for connection to a source of unheated fluid and a second inlet adapted for connection to a source of heated fluid and an outlet providing mixed flow from said first and second inlets, said valve means including:
      (i) a first solenoid actuated means operable upon energization and deenergization from a source of power to alternately permit and prevent flow from said first inlet to said outlet,
      (ii) a second solenoid actuated means operable upon energization and deenergization from a source of power to alternately permit and prevent flow from said second inlet to said outlet;
   (b) flow control valve means receiving at its inlet the flow from said fill valve means outlet, said flow control valve means having a solenoid actuated means, operable upon energization from a source of power to provide a second, or low, rate of fluid flow to the appliance receptacle and operable upon deenergization to provide a first, substantially higher, rate of fluid flow to the appliance receptacle; and,
   (c) duty cycle means, operable upon energization of the appliance motor, to alternately enable and disable said fill valve means for predetermined time intervals.

7. A control system for a laundry appliance of the type employing a motor energizable for agitating the articles to be washed in a fluid contained in a tub upon connection of the appliance to a source of heated and unheated washing fluid, said control system comprising:
   (a) energizable valve means operable upon energization to provide a preselected mixture of said heated and unheated washing fluid, said valve means including flow control means operable in the deenergized condition to provide a first or high rate of flow of said mixture and upon control operable energization to provide a second substantially lower rate of flow of said mixture;
   (b) timing means operatively responsive to energization of the appliance motor to provide said control output and a duty cycle output;
   (c) control switch means operable in response to said duty cycle output to disable said valve means for preventing flow of fluid to the tub; and,
   (d) by-pass means operative in response to said control output to energize said flow control means when said duty cycle output is at null.

* * * * *